(12) United States Patent
Matsuda

(10) Patent No.: US 10,606,684 B2
(45) Date of Patent: Mar. 31, 2020

(54) COMMUNICATION PROCESSING SYSTEM, TROUBLESHOOTING METHOD, AND MANAGEMENT SERVER FOR SURVEYING INSTRUMENT

(71) Applicant: TOPCON CORPORATION, Tokyo (JP)

(72) Inventor: Atsushi Matsuda, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 186 days.

(21) Appl. No.: 15/841,458

(22) Filed: Dec. 14, 2017

(65) Prior Publication Data

US 2018/0232269 A1 Aug. 16, 2018

(30) Foreign Application Priority Data

Feb. 10, 2017 (JP) .................. 2017-022796

(51) Int. Cl.
*G06F 11/07* (2006.01)
*G01C 3/00* (2006.01)
*G01C 3/02* (2006.01)
*G01C 25/00* (2006.01)

(52) U.S. Cl.
CPC ............. *G06F 11/079* (2013.01); *G01C 3/00* (2013.01); *G01C 3/02* (2013.01); *G01C 25/00* (2013.01); *G06F 11/0736* (2013.01); *G06F 11/0751* (2013.01); *G06F 11/0787* (2013.01)

(58) Field of Classification Search
CPC .............. G06F 11/079; G06F 11/0736; G06F 11/0751; G06F 11/0787
See application file for complete search history.

(56) References Cited

U.S. PATENT DOCUMENTS

| 8,145,073 | B2 * | 3/2012 | Bouchard | .......... G03G 15/5079 |
| | | | | 358/1.15 |
| 8,749,763 | B2 * | 6/2014 | Sakimura | ............. G01C 15/002 |
| | | | | 356/3.01 |
| 10,365,962 | B2 * | 7/2019 | Sherlock | ............... G06F 11/079 |
| 2012/0133918 | A1 | 5/2012 | Sakimura et al. | |
| 2017/0139762 | A1 * | 5/2017 | Sherlock | ............... G06F 11/079 |

FOREIGN PATENT DOCUMENTS

JP 2012117874 A 6/2012

* cited by examiner

*Primary Examiner* — Nadeem Iqbal
(74) *Attorney, Agent, or Firm* — Roberts Calderon Safran & Cole P.C.

(57) ABSTRACT

To provide a communication processing system, a troubleshooting method, and a management server for a surveying instrument, for a case where a prescribed error is not detected. A system includes a surveying instrument including a survey unit, a communication unit, a control unit, a storage unit, a display unit, and an error detection unit, a management server including a server communication unit, a server control unit, and a server storage unit, and an external terminal, and the server storage unit includes a question data table that functions when the error detection unit does not detect a prescribed error, the server control unit includes a question management unit that reads out the question data table and transmits it to the surveying instrument, and the surveying instrument includes a question display unit that makes the display unit hierarchically display a question list.

5 Claims, 6 Drawing Sheets

Select inquiry contents from those listed below

| 1 | Something wrong with those related to measurements |
| 2 | Something wrong with those related to angles |
| 3 | Something wrong with those related to data |
| 4 | Not able to update |
| 5 | Something wrong with those related to keys |
| 6 | Something wrong with those related to communications |
| 7 | . . . . |
| 8 | . . . . |
| 9 | . . . . |

51

28

Further select one that applies

| 1-1 | No measurement value comes out |
| 1-2 | Measurement value is large |
| 1-3 | Measurement value is small |
| 1-4 | . . . . |
| 1-5 | . . . . |

52

28

Further select one that applies

| 2-1 | Horizontal angle varies |
| 2-2 | Horizontal angle is not updated |
| 2-3 | Vertical angle varies |
| 2-4 | . . . . |
| 2-5 | . . . . |

53

28

Further select one that applies

| 3-1 | Screen under data retrieval/outputting continues |
| 3-2 | Something wrong with output data |
| 3-3 | No data has been retrieved |
| 3-4 | . . . . |
| 3-5 | . . . . |

| Version information | Classification I | Classification II | Classification III | Contents (examples) of undetected errors | Software information |
|---|---|---|---|---|---|
| 1 | Those related to angles | Horizontal angle | Correction | Error 1: Error of failing to correct | 11 |
| 2 | | Vertical angle | Offset | Error 2: Error that angle value varies | 12 |
| 3 | Those related to measurements | Not able to measure distance | | Error 3: Error of failing to display distance value | .... |
| 4 | | Erroneous distance measurement value | | Error 4: Error that measured distance value is large | .... |
| .... | Those related to external devices | Those related to communications | Bluetooth | Error 5: Error of failing to be connected by Bluetooth | .... |
| .... | | | RS232C | Error 6: Error of failing to communicate with external device by RS232C | .... |
| .... | | Commands | Command type | Error 7: Error being operation failure in response to command X | |
| .... | Those related to data retrieval and writing | Those related to communications | Bluetooth | Error 8: Error of failing to be connected by Bluetooth | .... |
| .... | | | RS232C | Error 9: Error of failing to output data by serial connection | .... |
| .... | | | USB | Error 10: Error of failing to write data to USB | .... |
| .... | | Output data | Format A | Error 11: Error when outputting data Y in format A | |
| .... | | Input data | Format B | Error 12: Error of failing to retrieve data Z in format B | .... |
| .... | Applied application function | Function A | Those related to measurements | Error 13: Error that measurement operation by function A sometimes fails | .... |
| .... | | Function B | Those related to display | Error 14: Error of failing to update angle value by function B | |
| .... | | Function C | Those related to calculations | Error 15: Error of failing to perform correction calculation when correction by function C is needed | .... |
| .... | | Function D | Those related to inputs | Error 16: Error of not being able to input negative distance value by function D | .... |

COMMUNICATION PROCESSING SYSTEM, TROUBLESHOOTING METHOD, AND MANAGEMENT SERVER FOR SURVEYING INSTRUMENT

TECHNICAL FIELD

The present invention relates to a communication processing system, a troubleshooting method, and a management server for a surveying instrument.

BACKGROUND ART

A surveying instrument (total station) performs distance measurement by irradiating distance-measuring light onto a measuring target and receiving reflected light therefrom. However, a trouble such as non-fulfillment of this function or a survey value whose accuracy is less than guaranteed accuracy occurs in some cases. Conventionally, when an inquiry informing that an appropriate survey could not be performed was received from a user, a sales representative went to the site and checked the product in question and operation, or a product was returned to a business office or factory and the cause was investigated.

In order to avoid this work as much as possible, a surveying instrument described in Patent Literature 1 has a self-check function to inspect whether an instrument operation is normal and whether the values are within the standards by itself. When an error is found, a solution method is notified to a user, and information thereon is compiled into a file and transmitted to a management server.

CITATION LIST

Patent Literature

Patent Literature 1: Japanese Published Unexamined Patent Application Publication No. 2012-117874

SUMMARY OF THE INVENTION

Technical Problem

Technologies used in conventional surveying instruments including the surveying instrument described in Patent Literature 1 functioned when an error was detected in the surveying instrument. When no error was detected, a user was notified that no error had been detected and the program ended. However, there were many cases where, even if no error was detected, a user felt uncomfortable when checking a survey result, and in such a case, the user just had to undertake the above-described conventional method to solve this problem. In addition, since no error was detected, the contents of the inquiry had to be checked again thoroughly, and exchange with the user tended to take time.

An object of the present invention is to provide a communication processing system, a troubleshooting method, and a management server for a surveying instrument, for a case where no error is detected.

Solution to Problem

In order to solve the above-described problem, a communication processing system for a surveying instrument according to an aspect of the present invention, includes a surveying instrument including a survey unit that performs a survey by receiving reflected light from a measuring target, a communication unit that enables communication with a network, a control unit that controls the survey unit and the communication unit, a storage unit that records information acquired by the control unit, a display unit that functions as an interface, and an error detection unit that inspects an instrument internal status and instrument logs, a management server including a server communication unit capable of communicating with the communication unit, a server control unit that processes information received by the server communication unit from the surveying instrument, and a server storage unit that records information processed by the server control unit, and an external terminal capable of acquiring information on the surveying instrument from the management server, wherein the server storage unit includes a question data table that functions when the error detection unit does not detect a prescribed error and guides narrowing-down of user's inquiry contents, the server control unit includes a question management unit that reads out the question data table and transmits it to the surveying instrument when the error detection unit does not detect a prescribed error, and the control unit of the surveying instrument includes a question display unit that makes the display unit hierarchically display a question list according to the question data table received from the question management unit.

In the aspect described above, it is also preferable that the server storage unit further includes an error search data table to narrow down inquiry contents set by the question list according to version information of the surveying instrument and classification information of the set inquiry contents and identify contents of an undetected error that the error detection unit did not detect, and the server control unit further includes an error search unit that requests information necessary for acquiring the version information and the classification information from the surveying instrument, and reads out the error search data table to identify contents of the undetected error.

In the aspect described above, it is also preferable that the error search data table stores past corrected software for contents of the undetected error.

In the aspect described above, it is also preferable that the error search data table stores a newly created corrected program when the past corrected software does not exist.

A troubleshooting method according to an aspect of the present invention is a troubleshooting method to be performed in a communication processing system for a surveying instrument, wherein the communication processing system for a surveying instrument includes at least a surveying instrument including a survey unit that performs a survey by receiving reflected light from a measuring target, a communication unit that enables communication with a network, a control unit that controls the survey unit and the communication unit, a storage unit that records information acquired by the control unit, a display unit that functions as an interface, and an error detection unit that inspects an instrument internal status and instrument logs, and a management server including a server communication unit capable of communicating with the communication unit, a server control unit that processes information received by the server communication unit from the surveying instrument, and a server storage unit that records information processed by the server control unit, and the method includes a step of checking whether the error detection unit of the surveying instrument has detected a prescribed error, and a step of reading out a question data table stored in the server storage unit and making the display unit hierarchically display a question list according to the question data table when the error detection unit does not detect the prescribed error.

It is also preferable that the method according to the aspect described above further includes a step of reading out, when inquiry contents are set by the question list, an error search data table stored in the server storage unit, and identifying contents of an undetected error that the error detection unit did not detect according to version information of the surveying instrument and classification information of the inquiry contents.

A management server according to an aspect of the present invention includes a server communication unit capable of communicating with a surveying instrument, a server control unit that processes information received by the server communication unit from the surveying instrument, and a server storage unit that records information processed by the server control unit, wherein the server storage unit includes a question data table that functions when an error detection unit that inspects an instrument internal status and instrument logs of the surveying instrument does not detect a prescribed error, and guides narrowing-down of user's inquiry contents, and an error search data table to narrow down inquiry contents set by the question data table in the surveying instrument according to version information of the surveying instrument and classification information of the inquiry contents and identify contents of an undetected error that the error detection unit did not detect, and the server control unit includes a question management unit that reads out, when the error detection unit does not detect the prescribed error, the question data table and transmits it to the surveying instrument, and an error search unit that requests information necessary for acquiring the version information and the classification information from the surveying instrument, and reads out the error search data table and identifies contents of the undetected error.

Effect of the Invention

According to the present invention, when no error is detected, it is possible to speed up investigation of the cause and troubleshooting.

BRIEF DESCRIPTION OF THE DRAWINGS

FIG. 4 is a view showing an example of a question list.

FIG. 5 shows a configuration example of an error search data table.

DESCRIPTION OF EMBODIMENTS

Next, preferred embodiments of the present invention are described with reference to the drawings.

(System Configuration)
(Surveying Instrument)

Figure 1:
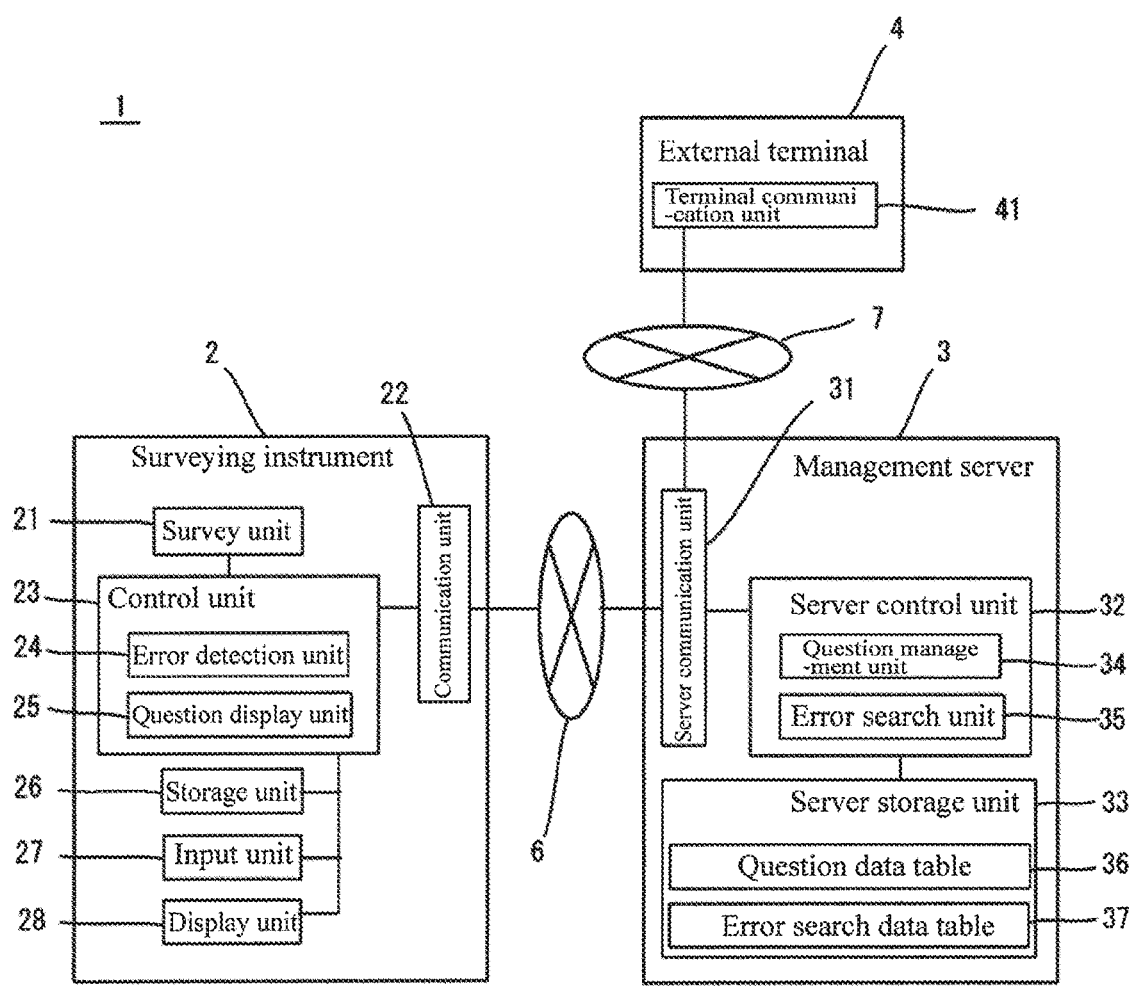
FIG. 1 is a system configuration diagram of a communication processing system for a surveying instrument according to an embodiment.
Figure 2:
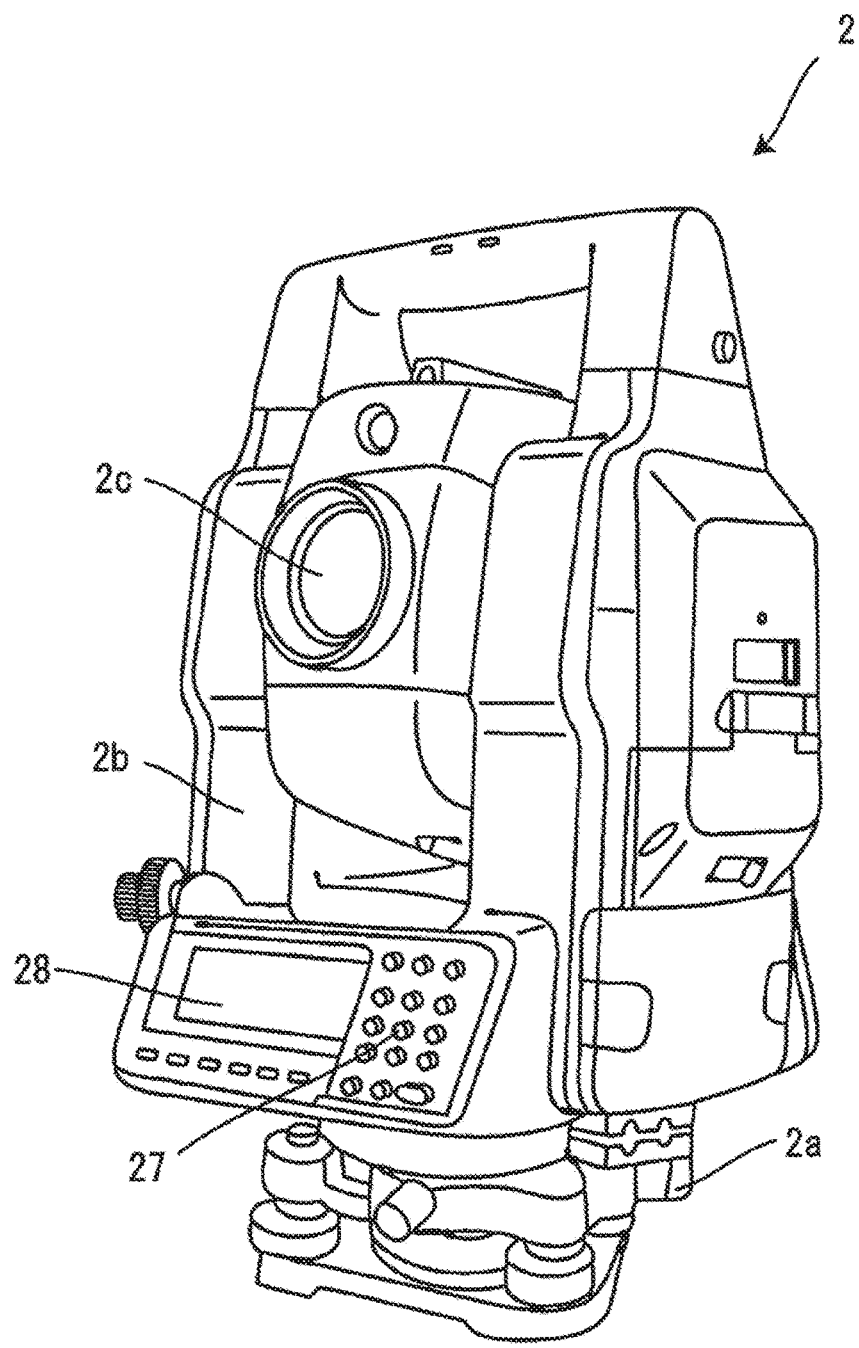
FIG. 2 is a right perspective view of a surveying instrument to be used in the system of FIG. 1.

FIG. 1 is a system configuration diagram of a communication processing system for a surveying instrument according to an embodiment, and FIG. 2 is a right perspective view of a surveying instrument to be used in the system of FIG. 1.

In FIG. 1, a communication processing system 1 for a surveying instrument (hereinafter, simply referred to as a system 1) is configured so that a surveying instrument 2, a management server 3, and an external terminal 4 can communicate with each other. The surveying instrument 2 and the management server 3 are connected by a network 6, and the management server 3 and the external terminal 4 are connected by a network 7. As an example, the network 6 consists of the Internet and a mobile phone line, and the network 7 consists of the Internet, a mobile phone line, an intranet, or an exclusive communication network.

The surveying instrument 2 is a total station. The surveying instrument 2 includes, as shown in FIG. 1, at least a survey unit 21, a communication unit 22, a control unit 23, a storage unit 26, an input unit 27, and a display unit 28. As shown in FIG. 2, in appearance, the surveying instrument includes a base portion 2a provided on a leveling unit, a bracket portion 2b that rotates horizontally on the base portion 2a, a telescope 2c that rotates vertically at the center of the bracket portion 2b, and the input unit 27 and a display unit 28 provided on a front surface of the bracket portion 2b.

The survey unit 21 includes a light emitting element, a distance-measuring optical system, and a light receiving element inside the telescope 2c, and measures a distance by emitting distance-measuring light from the light emitting element and receiving reflected light from a measuring target by the light receiving element. In addition, the survey unit 21 measures rotation angles of respective rotary shafts of the bracket portion 2b and the telescope 2c by using an angle detector (not shown).

The communication unit 22 enables communication with the network 6, and in response to a command from the control unit 23, transmits information on the surveying instrument 2 to the management server 3 and receives information from the management server 3.

The control unit 23 consists of, for example, a microcontroller having a CPU, a ROM, and a RAM, etc., mounted on an integrated circuit. The control unit 23 controls the survey unit 21 and the communication unit 22, and executes various processings based on various information input from the input unit 27 and the display unit 28.

The control unit 23 includes an error detection unit 24. The error detection unit 24 acquires information on a usage state of the surveying instrument 2, including an instrument internal status (an operating time, a number of distance measurements, a number of programs started, a substrate temperature, a humidity, each board output value, a battery, instrument adjustment data, and software version, etc.) and instrument logs (operation logs, internal communication logs, and external communication logs, etc.). Then, the error detection unit 24 inspects operation normality and whether values are within standards in terms of the instrument internal status and instrument logs. An error detected by the error detection unit 24 is associated with an error code, and recorded in the storage unit 26 together with a date and time of occurrence. For convenience of description, hereinafter, an error detected by the error detection unit 24 is referred to as a prescribed error, and an error that was not detected by the error detection unit 24 is referred to as an undetected error.

In addition, the control unit 23 includes a question display unit 25. The question display unit 25 functions when a prescribed error is not detected by the error detection unit 24. Based on question information transmitted from the management server 3 described below, the question display unit 25 displays a question list 50 on the display unit 28. Details are described below.

The storage unit 26 consists of, for example, a memory card, an HDD, or the like. The storage unit 26 stores various programs for the processing described above. In addition, a distance measurement value and an angle measurement value obtained through a survey are recorded, and various information acquired by the control unit 23 is recorded.

The input unit 27 includes numeric keys, a decimal key, plus/minus keys, an execution key, and a scroll key, etc., and can select/determine/cancel, etc., an operation displayed on the display unit 28.

The display unit 28 has a liquid crystal screen, and allows for touch-screen inputs as well. On the liquid crystal screen, images relating to various applications are displayed, and an operator is guided thereby to execute various applications.

(Management Server)

The management server 3 includes at least a server communication unit 31, a server control unit 32, and a server storage unit 33.

The server communication unit 31 can communicate with the communication unit 22 of the surveying instrument 2 and a terminal communication unit 41 of the external terminal 4. The server communication unit 31 can also communicate with a plurality of surveying instruments (not shown) other than the surveying instrument 2.

The server control unit 32 consists of, for example, a microcontroller including a CPU, a ROM, and a RAM, etc., mounted on an integrated circuit. The server control unit 32 records various information, received by the server communication unit 31 from the surveying instrument 2, in the server storage unit 33.

In addition, the server control unit 32 includes a question management unit 34 and an error search unit 35. The question management unit 34 functions when the error detection unit 24 of the surveying instrument 2 does not detect a prescribed error. The error search unit 35 functions when performing searching to identify an undetected error. Details are described below.

The server storage unit 33 consists of a fixed disk device such as an HDD or a storage means such as an SSD. In the server storage unit 33, various programs for processing of the server control unit 32 are stored. The server storage unit 33 accumulates unique information of each surveying instrument with which communication was made.

In addition, the server storage unit 33 includes a question data table 36. The question data table 36 guides narrowing-down of user's inquiry contents, and has a hierarchy structure.

Figure 3:
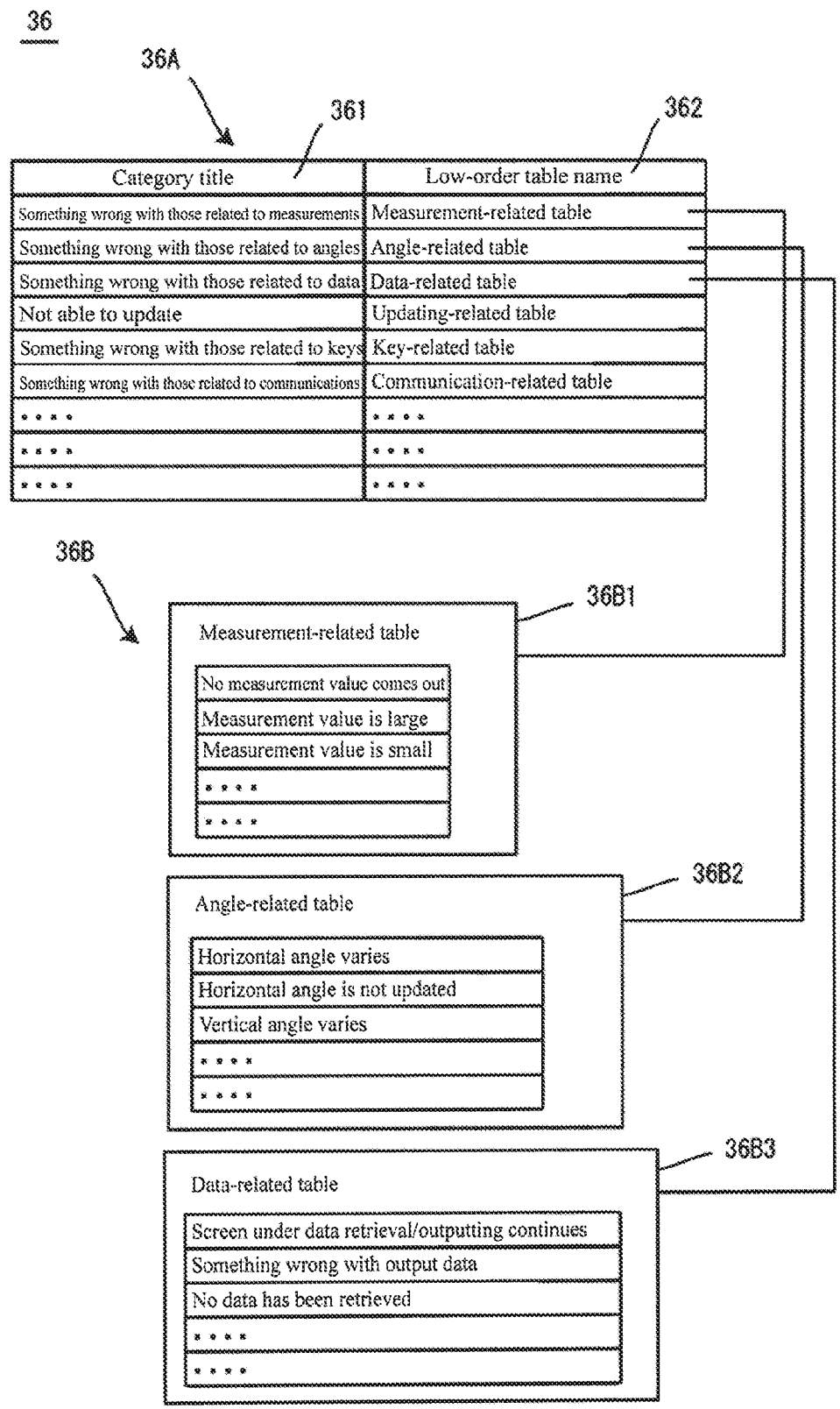
FIG. 3 shows a configuration example of a question data table.

FIG. 3 shows a configuration example of the question data table 36. The question data table 36 includes a high-order table 36A and low-order tables 36B. In the high-order table 36A, category titles 361 and low-order table names 362 are stored. As the category titles 361, questions are listed up in categories through the eyes of users, and for example, items such as something wrong with those related to measurements, something wrong with those related to angles, something wrong with those related to data, being not able to update, something wrong with those related to keys, and something wrong with those related to communications, etc., are listed up. As the low-order table names 362, table names are stored one-to-one corresponding to the category titles 361. The table names respectively correspond to the low-order tables 36B. In the low-order tables 36B, items further subdividing the categories of the high-order table 36A are listed up. For example, in the measurement-related table 36B1, items such as "no measurement value comes out," "the measurement value is large," and "the measurement value is small," etc., are listed up. In the angle-related table 36B2, items such as "the horizontal angle varies," "the horizontal angle is not updated," and "the vertical angle varies are listed up," etc. In the data-related table 36B3, items such as "screen under data retrieval/outputting continues," "something wrong with output data," and "no data has been retrieved," etc., are listed up. Lower-order tables further subdividing the low-order tables 36B may be provided. In these tables, change, addition, and deletion of items can be made from the external terminal 4.

FIG. 4 is a view showing an example of a question list 50. The question list 50 is displayed according to the hierarchy structure of the question data table 36. In the question list 50, first, as shown in a first screen 51, items in the high-order table 36A of the question data table 36 are readout and listed up on the display unit 28. Then, for example, when "1" is selected on the first screen 51, the first screen is shifted to a second screen 52, and items in the low-order table 36B1 are read out and listed up on the display unit 28. When "2" is selected on the first screen 51, the first screen is shifted to a third screen 53, and items in the low-order table 36B2 are read out and listed up on the display unit 28. When "3" is selected on the first screen 51, the first screen is shifted to a fourth screen 54, and items in the low-order table 36B3 are read out and listed up on the display unit 28.

In addition, the server storage unit 33 includes an error search data table 37. Inquiry contents set by the question list 50 are provided with classification information using a keyword. The error search data table 37 is configured so that an undetected error can be identified by refining the inquiry contents according to version information and the classification information.

FIG. 5 shows a configuration example of the error search data table 37. In FIG. 5, version information 371 shows a version of software installed in the surveying instrument 2. Classification information 372 shows a category of a trouble based on the keyword. In classification I, for example, classification into those related to angles, those related to measurements, those related to external devices, those related to data retrieval/writing, and applied application functions, etc., is performed.

Classification II shows categories of troubles subdividing classification I. In classification II, for example, those related to angles are subdivided into horizontal angles/vertical angles, those related to measurements are subdivided into not being able to measure/erroneous distance measurement value, those related to external devices are subdivided into those related to communications/commands, those related to data retrieval/writing are subdivided into those related to communications/output data/input data, and applied application functions are subdivided into function A/function B/function C/function D.

Classification III is information on categories of troubles when classification II needs to be further subdivided. In classification III, for example, items of horizontal angles and vertical angles are subdivided into correction/offset, items related to communications with external devices are subdivided into Bluetooth (registered trademark, the same applies to hereinafter)/RS232C, items of commands are subdivided by command type, items related to communications for data retrieval/writing are subdivided into Bluetooth/RS232C/USB, items of output data and input data are subdivided by format, and items of functions of applied applications are subdivided into those related to measurements/those related to display/those related to calculations/those related to inputs.

In the error search data table 37, contents 375 of undetected errors are stored in association with troubles narrowed down by the version information 371 and the classification information 372. Contents 375 of undetected errors are stored such that, as an example, an error of failing to correct a horizontal angle is classified into the "correction" category of classification III, an error that a value of a vertical angle varies is classified into the "offset" category of classification III, an error of failing to display a distance measurement value as not being able to measure a distance is classified into the "not being able to measure distance" category of classification II, an error that a distance measurement value is large as an erroneous distance measurement value is classified into the "erroneous distance measurement value" category of classification II, an error of failing to be connected to an external device by Bluetooth is classified into the "Bluetooth" category of classification II of those related to external devices, an error of failing to communicate with an external device by RS232C is classified into the "RS232C" category of classification III of those related to external devices, an error being an operation failure in response to a command X with an external device is classified into "command type" of classification III of those related to external devices, an error of failing to connect data input/output by Bluetooth is classified into the "Bluetooth" category of classification III of those related to data, an error of failing to output data by RS232C serial connection is classified into the "RS232C" category of classification III of those related to data, an error of failing to write data to a USB is classified into the "USB" category of classification III of those related to data, an error when outputting data Y in format A is classified into the "format A" category of classification III of those related to data, an error when retrieving data Z in format B is classified into the "format B" category of classification III of those related to data, an error that measurement operation by function A sometimes fails is classified into the "those related to measurements" category of classification III of applied applications, an error of failing to update an angle value by function B is classified into the "those related to display" category of the same classification III, an error of failing to perform correction calculation when correction by function C is needed is classified into the "those related to calculations" category of the same classification III, and an error of not being able to input a negative distance value by function D is classified into the "those related to inputs" category of the same classification III, and so on.

In the error search data table 37, software information 376 for contents 375 of undetected errors is stored. Contents 375 of undetected errors and software information 376 are tied to each other by, for example, error numbers (error 1, error 2 . . . ) attached to the contents 375 of undetected errors. In the software information 376, when there is corrected software created in the past for contents 375 of an undetected error, a corrected software version name is stored.

(External Terminal)

The external terminal 4 is a personal computer or the like, and has the authority to communicate with the management server 3 by the terminal communication unit 41 and access information stored in the server storage unit 33. In addition, the external terminal 4 can transmit necessary information to the management server 3.

(Troubleshooting Method)

Next, a troubleshooting method using the system 1 described above is described.

A surveying instrument in recent years records error codes like the error detection unit 24 of the surveying instrument 2. However, when an error in question is not a prescribed error, the surveying instrument is notified that no error has been detected and the program ends. On the other hand, the troubleshooting method according to the present embodiment is for a case where an operator senses something wrong when checking a survey result or the like although no prescribed error has been detected by the error detection unit 24.

Figure 6:
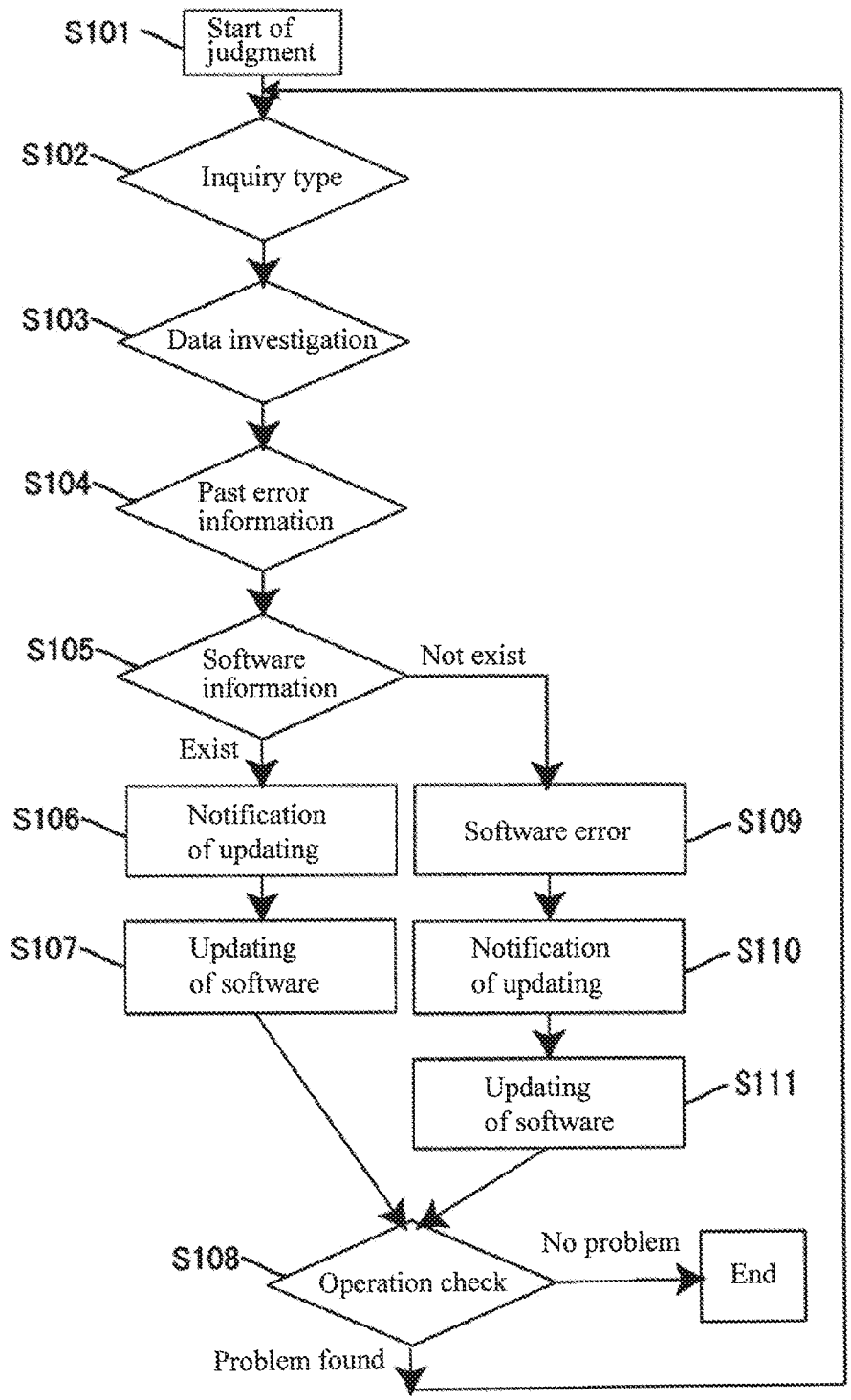
FIG. 6 is a flowchart of a troubleshooting method according to an embodiment.

FIG. 6 is a flowchart of the troubleshooting method according to the embodiment. When an operator who senses something wrong selects an inquiry button, the process shifts to Step S101 and judgment is started. The surveying instrument 2 checks whether a prescribed error has been detected by the error detection unit 24. When no prescribed error is detected, the control unit 23 of the surveying instrument 2 communicates with the management server 3.

Next, the process shifts to Step S102, and the management server 3 that received information showing that no prescribed error has been detected starts the question management unit 34, reads out question information from the question data table 36, and transmits this question information to the surveying instrument 2. When having received the question information, according to its hierarchy structure, the question display unit 25 of the surveying instrument 2 makes the display unit 28 display the question list 50 to select an inquiry type. When the operator selects inquiry contents from the question list 50, the question display unit 25 transmits the set inquiry contents to the management server 3.

Next, the process shifts to Step S103, and the question management unit 34 of the management server 3 that received the inquiry contents transmits information to the error search unit 35. The error search unit 35 requests version information 371 and data immediately preceding occurrence of the trouble from the surveying instrument 2. As this immediately preceding data, at least instrument internal log information (user key operation history information, error information, etc., immediately preceding occurrence of the trouble), and information necessary for settling classification information 372 of the error search data table 37 (user setting information, angle-related information, distance measurement value-related information, etc.) are acquired. This immediately preceding data preferably includes data relating to the second or third last operation procedures before occurrence of the inquiry. The error search unit 35 transmits the inquiry contents, the version information, and the immediately preceding data to the external terminal 4. An engineer on the external terminal 4 side investigates information transmitted from the management server 3. When the engineer identifies the classification information 372 of the inquiry contents, the version information 371 and the classification information 372 are transmitted to the management server 3.

Next, the process shifts to Step S104, and the error search unit 35 of the management server 3 that received the version information 371 and the classification information 372 identifies, based on these information, the contents 375 of an undetected error by using the error search data table 37.

Next, the process shifts to Step S105, and the error search unit 35 checks whether corrected software for the contents 375 of the undetected error exists by using the error search data table 37. When corrected software exists, the process shifts to Step S106. When corrected software does not exist, the process shifts to Step S109.

When the process shifts to Step S106, the data search unit 35 of the management server 3 transmits a corrected program of a software version stored in the software information 376 to the surveying instrument 2 and makes a notification of updating.

Next, the process shifts to Step S107, and the surveying instrument 2 that received the corrected program outputs a notification of updating to the display unit 28. The operator executes updating.

When updating is completed, the process shifts to Step S108, and a "check button" is displayed on the display unit 28 of the surveying instrument 2 to prompt operation check. When operation of the corrected software is normal, "No problem" is displayed on the display unit 28, and the program ends. When operation is abnormal, "Problem found" is displayed on the display unit 28, and the program returns to Step S102.

On the other hand, when it is judged in Step S105 that there is no past corrected software, and the process shifts to Step S109, the error search unit 35 notifies this to the external terminal 4. An engineer on the external terminal 4 side creates a new corrected program for the undetected error and transmits it to the management server 3.

Next, the process shifts to Step S110, and the management server 3 transmits the above-described new corrected program to the surveying instrument 2 and makes a notification of updating. Next, the process shifts to Step S111, and the surveying instrument 2 that received the corrected program outputs a notification of updating to the display unit 28 and the operator executes updating. When updating is completed, the process shifts to Step S108 and operation check is performed.

(Operation and Effect)

As described above, according to the system 1 of the present embodiment, the surveying instrument 2 includes the question display unit 25, and the management server 3 includes the question management unit 34 and the question data table 36, so that when there is no obvious error and an inquiry index is ambiguous, the question list 50 is displayed and a user can be guided. Accordingly, a time for exchange with the user can be reduced.

According to the system 1 of the present embodiment, since the management server 3 includes the error search unit 35 and the error search data table 37 to handle an undetected error, in response to an inquiry from the surveying instrument 2, contents 375 of an undetected error can be promptly identified based on enormous information on a plurality of surveying instruments stored in the management server 3. In addition, software information 376 as to whether there is past corrected software is stored in the error search data table 37, so that for contents 375 of an undetected error that has been solved previously, a solution can be promptly brought about.

Preferably, when normal operation of a new corrected program created in Step S109 of the troubleshooting method described above is confirmed in Step S108 described above, the engineer of the external device 4 stores this corrected program in the management server 3 and stores a software version name in the software information 376 of the error search data table 37. Accordingly, unprecedented error handling can be accumulated in the management server 3, so that the next and subsequent undetected errors can be solved promptly.

In the embodiment, in "data investigation" in Step S103 of FIG. 6 described above, classification information 372 of inquiry contents is identified by the engineer, however, the error search unit 35 of the management server 3 may be arranged to perform this identification. In this case, it is also preferable that when a problem is found by "operation check" of Step S108, the process returns to Step S103 and the engineer performs the identification.

The preferred embodiments and the modifications of the present invention are described above, and the embodiments and the respective modifications can be combined based on knowledge of a person skilled in the art, and such a combined embodiment is also included in the scope of the present invention.

REFERENCE SIGNS LIST

1 Communication processing system for surveying instrument
2 Surveying instrument
3 Management server
4 External terminal
6 Network
7 Network
21 Survey unit
22 Communication unit
23 Control unit
24 Error detection unit
25 Question selection unit
26 Storage unit
27 Input unit
28 Display unit
31 Server communication unit
32 Server control unit
33 Server storage unit
34 Question management unit
35 Error search unit
36 Question data table
37 Error search data table
371 Version information
372 Classification information
375 Contents of undetected error
376 Software information
41 Terminal communication unit
50 Question list

The invention claimed is:

1. A communication processing system for a surveying instrument, comprising:
   a surveying instrument including a survey unit that performs a survey by receiving reflected light from a measuring target,
   a communication unit that enables communication with a network,
   a control unit that controls the survey unit and the communication unit,
   a storage unit that records information acquired by the control unit,
   a display unit that functions as an interface, and
   an error detection unit that inspects an instrument internal status and instrument logs;
   a management server including a server communication unit capable of communicating with the communication unit,
   a server control unit that processes information received by the server communication unit from the surveying instrument, and
   a server storage unit that records information processed by the server control unit; and an external terminal capable of acquiring information on the surveying instrument from the management server, wherein the server storage unit includes a question data table that functions when the error detection unit does not detect a prescribed error and guides narrowing-down of a user's inquiry contents, the server control unit includes a question management unit that reads out the question data table and transmits it to the surveying instrument when the error detection unit does not detect a prescribed error, and the control unit of the surveying instrument includes a question display unit that makes the display unit hierarchically display a question list according to the question data table received from the question management unit, and wherein the server storage unit further includes an error search data table to narrow down inquiry contents set by the question list according to version information of the surveying instrument and classification information of the set inquiry contents and identify contents of an undetected error that the error detection unit did not detect, and the server control unit further includes an error search unit that requests information necessary for acquiring the version information and the classification information from the surveying instrument, and reads out the error search data table to identify contents of the undetected error.

2. The communication processing system for a surveying instrument according to claim 1, wherein the error search data table stores past corrected software for contents of the undetected error.

3. The communication processing system for a surveying instrument according to claim 2, wherein the error search data table stores a newly created corrected program when the past corrected software does not exist.

4. A troubleshooting method to be performed in a communication processing system for a surveying instrument, wherein the communication processing system for a surveying instrument includes at least a surveying instrument including a survey unit that performs a survey by receiving reflected light from a measuring target, a communication unit that enables communication with a network, a control unit that controls the survey unit and the communication unit, a storage unit that records information acquired by the control unit, a display unit that functions as an interface, and an error detection unit that inspects an instrument internal status and instrument logs, and a management server including a server communication unit capable of communicating with the communication unit, a server control unit that processes information received by the server communication unit from the surveying instrument, and a server storage unit that records information processed by the server control unit, and the method comprises:

a step of checking whether the error detection unit of the surveying instrument has detected a prescribed error;

a step of reading out a question data table stored in the server storage unit and making the display unit hierarchically display a question list according to the question data table when the error detection unit does not detect the prescribed error, and a step of reading out, when inquiry contents are set by the question list, an error search data table stored in the server storage unit, and identifying contents of an undetected error that the error detection unit did not detect according to version information of the surveying instrument and classification information of the inquiry contents.

5. A management server comprising:

a server communication unit capable of communicating with a surveying instrument;

a server control unit that processes information received by the server communication unit from the surveying instrument; and a server storage unit that records information processed by the server control unit, wherein the server storage unit includes a question data table that functions when an error detection unit that inspects an instrument internal status and instrument logs of the surveying instrument does not detect a prescribed error, and guides narrowing-down of a user's inquiry contents, and an error search data table to narrow down inquiry contents set by the question data table in the surveying instrument according to version information of the surveying instrument and classification information of the inquiry contents and identify contents of an undetected error that the error detection unit did not detect, and the server control unit includes a question management unit that reads out, when the error detection unit does not detect the prescribed error, the question data table and transmits it to the surveying instrument, and an error search unit that requests information necessary for acquiring the version information and the classification information from the surveying instrument, and reads out the error search data table and identifies contents of the undetected error.

* * * * *